(12) United States Patent
Kaskiala

(10) Patent No.: US 12,122,179 B2
(45) Date of Patent: Oct. 22, 2024

(54) SECURITY DOCUMENT WITH DOUBLE VERIFICATION LENSES

(71) Applicant: THALES DIS FRANCE SAS, Meudon (FR)

(72) Inventor: Toni Kaskiala, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/603,595

(22) PCT Filed: Apr. 8, 2020

(86) PCT No.: PCT/EP2020/060049
§ 371 (c)(1),
(2) Date: Oct. 14, 2021

(87) PCT Pub. No.: WO2020/212230
PCT Pub. Date: Oct. 22, 2020

(65) Prior Publication Data
US 2022/0194116 A1  Jun. 23, 2022

(30) Foreign Application Priority Data
Apr. 18, 2019 (EP) .................................. 19305511

(51) Int. Cl.
*B42D 25/24* (2014.01)
*B42D 25/342* (2014.01)
(Continued)

(52) U.S. Cl.
CPC ........... *B42D 25/351* (2014.10); *B42D 25/24* (2014.10); *B42D 25/342* (2014.10);
(Continued)

(58) Field of Classification Search
CPC ..... B42D 25/24; B42D 25/351; B42D 25/342
(Continued)

(56) References Cited

U.S. PATENT DOCUMENTS

| 6,104,812 A * | 8/2000 | Koltai ............... H04N 1/32208 380/54 |
| 2007/0229263 A1* | 10/2007 | Staub ............... G06K 19/07363 340/572.1 |

(Continued)

FOREIGN PATENT DOCUMENTS

| CA | 2294755 A1 | 1/1999 | |
| EP | 3457323 A1 * | 3/2019 | ............. B42D 25/00 |

(Continued)

OTHER PUBLICATIONS

FR-2918311-A1 English Translation (Year: 2009).*
(Continued)

*Primary Examiner* — Kyle R Grabowski

(57) ABSTRACT

A multipage security document has a first verification lens located in a see-through portion and corresponding to a first verification feature and a second verification lens collocated with the first verification lens as an adjacent layer to the first verification lens in the see-through portion and corresponding to a second verification feature. The multipage security document can contain a first sheet and a second sheet connected along one side to the first sheet such that the second sheet may be placed against the first sheet, the second sheet having a see-through portion. Other embodiments are disclosed.

14 Claims, 17 Drawing Sheets

(51) Int. Cl.
  *B42D 25/351* (2014.01)
  *B42D 25/382* (2014.01)
  *G06F 21/62* (2013.01)
  *G06F 21/86* (2013.01)

(52) U.S. Cl.
  CPC ....... *B42D 25/382* (2014.10); *G06F 21/6218* (2013.01); *G06F 21/86* (2013.01)

(58) Field of Classification Search
  USPC .................................................. 283/98, 106
  See application file for complete search history.

(56) References Cited

U.S. PATENT DOCUMENTS

| | | | |
|---|---|---|---|
| 2012/0140333 A1* | 6/2012 | Tomczyk | G02B 27/0961 359/619 |
| 2017/0096026 A1* | 4/2017 | Sailer | B42D 25/29 |
| 2018/0186166 A1 | 7/2018 | Holmes | |

FOREIGN PATENT DOCUMENTS

| | | | | |
|---|---|---|---|---|
| FR | 2918311 A1 * | 1/2009 | ............. | B42D 25/24 |
| FR | 3013258 A1 * | 5/2015 | ............. | B42D 25/351 |
| GB | 2548643 A * | 9/2017 | ............. | B42D 25/351 |
| WO | WO-9815418 A1 * | 4/1998 | ............. | B42D 25/328 |
| WO | WO-2015030575 A1 * | 3/2015 | ............. | B42D 25/24 |

OTHER PUBLICATIONS

International Search Report (PCT/ISA/210) and Written Opinion (PCT/ISA/237) dated Jun. 12, 2020, by the European Patent Office as the International Searching Authority for International Application No. PCT/EP2020/060049 (WO2020/212230)—[24 pages].

* cited by examiner

SECURITY DOCUMENT WITH DOUBLE VERIFICATION LENSES

BACKGROUND OF THE INVENTION

The present invention relates, generally, to security features of security documents, and, more particularly, to security documents with see-through portions having verification lenses for revealing hidden information.

Multi-page security documents may include hidden information in images. This hidden information may be revealed using a decoding lens placed over the hidden information.

Often persons scrutinizing security documents are very rushed, e.g., officers processing travelers through passport controls, and may not have much time to look at all security features incorporated into a security document. Usually, the scrutinizing persons primarily view data pages having information that identifies the bearer of the document. It is, therefore, a weakness in a document if a particular security feature is not available to the scrutinizing person regardless of which page of the document is being viewed.

From the foregoing, it is apparent that there is a need for improved security documents in which a window providing a decoding lens may reveal hidden information from either side of the window.

SUMMARY

A multipage security document has a first verification lens located in a see-through portion and corresponding to a first verification feature and a second verification lens collocated with the first verification lens as an adjacent layer to the first verification lens in the see-through portion and corresponding to a second verification feature. The multipage security document contains a first sheet and a second sheet connected along one side to the first sheet such that the second sheet may be placed against the first sheet, the second sheet having a see-through portion.

In an embodiment, the multipage security document contains a third sheet connected along one side to the first and second sheet, the third sheet located adjacent to the second sheet. In such embodiment, the first verification feature is located on a fourth page located on the third sheet on a side of the third sheet adjacent to the second sheet, the first verification lens is a decoding lens, the first verification feature is a first hidden information located in a first image printed on the fourth page such that when the see-through portion is placed above the first image, the first verification feature is revealed by the first verification lens and the second verification feature is located on a first page located on the first sheet on a side adjacent to the second sheet the second verification lens is a decoding lens, the second verification feature is a second hidden information located in a second image located on the first page such that when the see-through portion is placed above the second image, the second hidden information is revealed by the second verification lenses.

In an embodiment, the multi-page security document includes at least a first page located on the first sheet and adjacent to the second sheet, a second page located on the second sheet and adjacent to the first sheet, a third page located on the second sheet opposite the second page, and a fourth page located on the third sheet and adjacent to the second page. In such embodiment, the first verification feature is a first hidden information located in a second image printed on the first page such that when the see-through portion is placed above the second image the first verification feature is revealed by the first verification lens and the second verification feature is a second hidden information located in the second image such that when the see-through portion is placed above the second image, the second hidden information is revealed by the second verification lens.

In an embodiment, the second verification feature is a moiré base layer located in the second image such that when the see-through portion is placed above the second image, the second verification feature is magnified through moiré magnification produced by the second verification lens.

In an embodiment, the multi-page security document includes at least a first page located on the first sheet and adjacent to the second sheet, a second page located on the second sheet and adjacent to the first sheet, a third page located on the second sheet opposite the second page, and a fourth page located on the third sheet and adjacent to the third page. In such embodiment, the first verification feature is a first hidden information located in a first image printed on the fourth page such that when the see-through portion is placed above the first image the first verification feature is revealed by the first decoding lens and the second verification features includes at least one array of partial images visible through the second verification lens such that the each array of partial images is seen as one complete image at a particular viewing angle associated with said each array of partial images.

In an embodiment, at least one array of partial images includes at least two arrays of partial images visible at different viewing angles thereby through the tilting of the security document allowing switching between display of at least two images. In one aspect of such embodiment, the first array of partial images is viewable through a first lens in a first view angle and a second array of partial images is included in the second verification lens, the second array of partial images viewable through a second view angle.

In one embodiment, the first decoding lens is a lenticular lens of parallel lenticules and the second decoding lens is a lenticular lens of parallel lenticules and wherein the orientation of the lenticules of the first decoding lens is rotated by at least 10 degrees with respect to the orientation of the lenticules of the second decoding lens. In another embodiment, at least the first or the second decoding lens is a lenticular lens having non-linear lenticules.

In one aspect, the first decoding lens has a first optimal distance for decoding the first hidden information and second decoding lens has a second optimal distance for decoding the second hidden information, wherein first decoding lens is at the first optimal distance from the first sheet when first sheet and second sheet are open by the first optimal distance and wherein the second decoding lens is at the second optimal distance from the first sheet when the first sheet and second sheet are flush against each other.

In one embodiment, the first decoding lens or the second decoding lens is flush with respect to a surface of the first sheet. In an alternative aspect, at least one of first and second decoding lens is not flush with respect to a surface of the first sheet.

In one embodiment, the hidden information is placed in the second image using a printing technique such as intaglio, offset, silkscreen, or ink jet. In an alternative, the hidden information is printed in the second image using visible-light visible ink, fluorescent ink, infra-red transparent ink, or infra-red absorbent ink.

In an aspect the first and the second verification lenses are transparent or, at least, translucent.

In an embodiment, the multipage security document includes a third transparent layer located in the see-through portion.

DETAILED DESCRIPTION OF THE INVENTION

Figure 1:
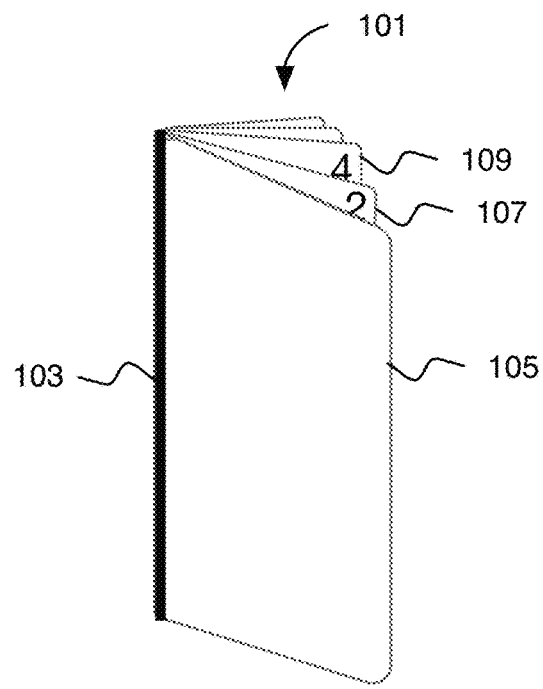
FIG. 1 is an illustration of a multi-page security document, e.g., a passport book.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figures 2A, 2B:
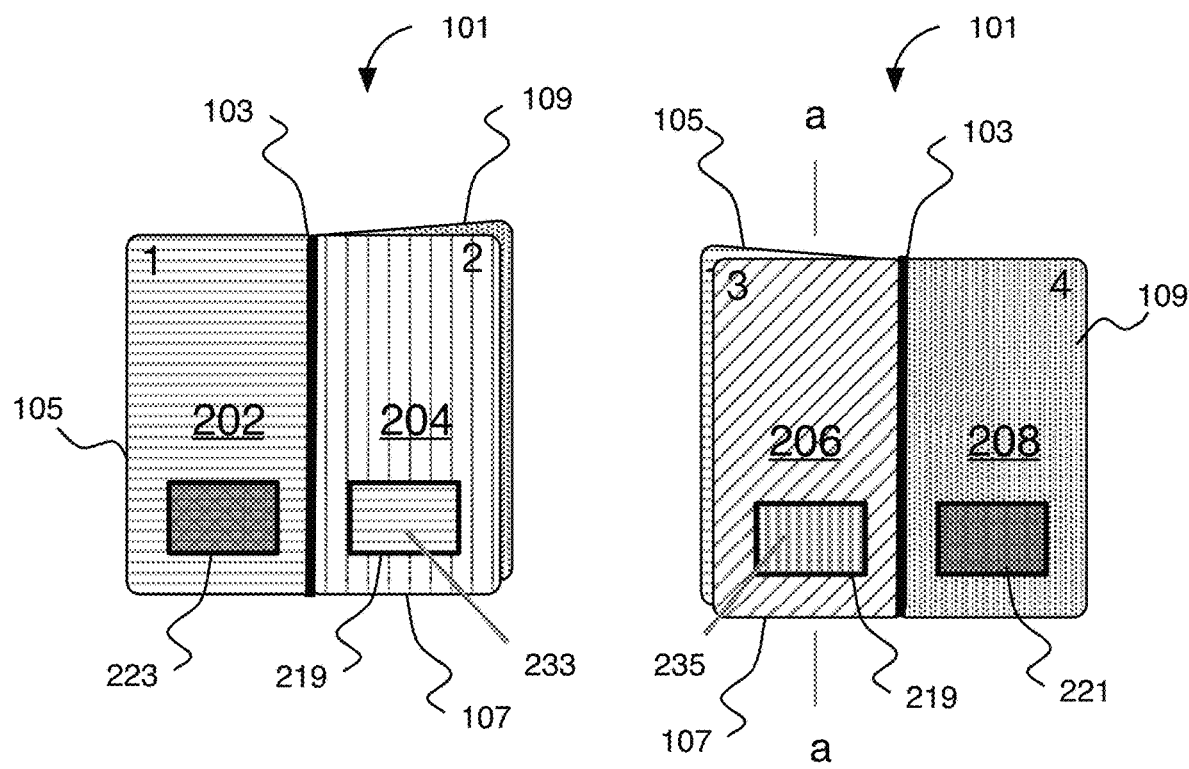
FIG. 2, which consists of FIGS. 2a and 2b, illustrates different possible page spreads of the multi-page security document of FIG. 1.

FIG. 1 is an illustration of a multi-page identification document 101 having three consecutive sheets, which are referred to herein as the first sheet 105, the second sheet 107, and the third sheet 109, respectively. Each sheet has a front page and a back page. The sheets 105-107 are bound together along one side using a binding 103. Thus, the three consecutive sheets may be opened to two possible two-page spreads as is illustrated in FIG. 2, which consists of FIGS. 2a and 2b, respectively:

Page 1/page 2 page-spread: Page 1, which is the back page 202 of the first sheet 105, and page 2, the front page 204 of the second sheet 107

Page 3/page 4 page-spread: Page 3, which is the back page 206 of the second sheet 107, and page 4, the front page 208 of the third sheet 109

The second sheet 107 contains a see-through portion 219. The see-through portion 219 may be a window, i.e., an area covering a portion of the second sheet 107, as illustrated in FIGS. 2a and 2b, may be the entire second sheet 107 or may be any subset of the second sheet 107, e.g., a region that starts at one edge of the second sheet 107 and is contiguous up to a central dividing line.

The fourth page 208 contains a first image 221 and the first page 202 contains a second image 223. As described in greater detail hereinbelow in conjunction with an illustrative example, the first image 221 is located on the fourth page 208 such that when the multi-page security document 101 is opened to the page 1/page 2 page-spread (FIG. 2a), the first image 221 is at least partially visible through the see-through portion 219. Conversely, the second image 223 is located on the first page 202 such that when the multi-page security document 101 is opened to the page 3/page 4 page-spread (FIG. 2b), the second image 223 is at least partially visible through the see-through portion 219.

Figure 3:
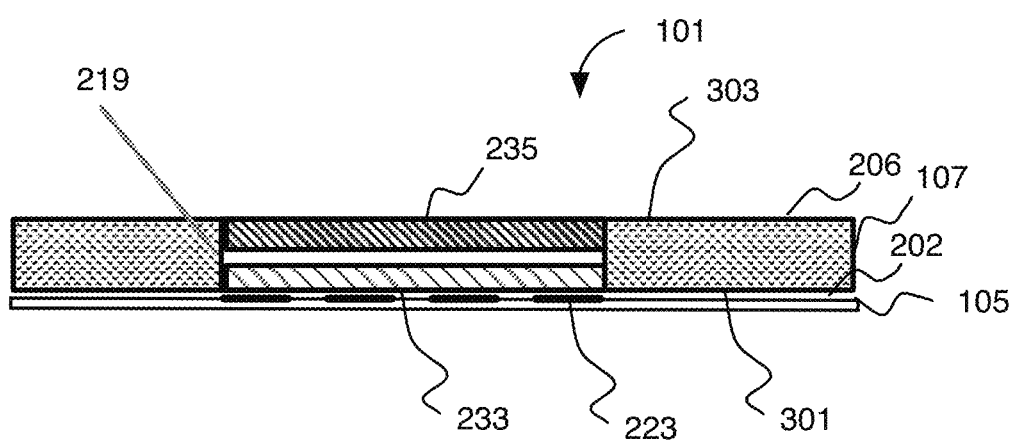
FIG. 3 is a cross-section of the security-features sheet taken along the line a-a of FIG. 2b.

As illustrated in greater detail in FIG. 3, the see-through portion 219 is covered by a first verification lens 233 and a second verification lens 235 that are located one above the other such that the first verification lens 233 covers the see-through portion on the second page 204 and the second verification lens 235 covers the see-through portion on the third page 206. Each of the verification lenses 233 and 235 are transparent or, at least, translucent.

The see-through portion 219 may include one or more additional transparent (or, at least, translucent) layer (not shown). These layers include cover films and spacers.

Each of the verification lenses 233 and 235 correspond to verification information of some sort. In one embodiment, the verification lenses are used to reveal some form of hidden information. That may be through decoding of information that is embedded in an image or may be through a moiré effect where the verification lens is used as a moiré magnification device to reveal a moiré pattern hidden as a moiré base layer and not otherwise visible.

Both the first image 221 and the second image 223 contain hidden information that are not visible with an unaided eye. However, the hidden information of the first image 221 is decoded, at least, by the first decoding lens 233 and the hidden information of the second image 223 is decoded, at least, by the second decoding lens 235. While in the illustration, the hidden information of the respective first and second images 221 and 223 are decoded by the decoding lens 233/235 that is furthest away from the image 221/223 when the second sheet 107 is placed flush to or proximate to the page that contains the image. In an alternative embodiment, the hidden information of a particular image is decoded by the decoding lens that is closest to the image.

Hiding information in the first image 221 and the second image 223 as well as decoding the hidden information using a corresponding coding lens may, for example, be performed using the techniques described in U.S. Pat. No. 6,104,802 to Koltai, et al., assigned to Juratrade Limited, the entire disclosure of which is incorporated herein by reference.

In an alternative embodiment, at least one of the verification lenses 233 and 235 is a moiré magnification device.

In yet another alternative embodiment, at least one of the verification lenses 233 and 235 contains partial images that appear as a composite image when viewed through the other of said verification lenses 233 and 235, respectively.

FIG. 3 is a cross-section of the first sheet 105 and the second sheet 107 taken along the line a-a of FIG. 2b when the multi-page security document 101 is open to the page 3/page 4 page spread and, conversely, the second sheet 107 is in close proximity or flush with the first sheet 105. The see-through portion 219 penetrates through the entire cross-section of the second sheet 107. The first decoding lens 233 is positioned approximately flush with a lower surface 301 of second sheet 107, wherein the lower surface 301 corresponds to the second page 204 printed on the front side of the second sheet 107. The second decoding lens 235 is located above the first decoding lens 233 and is positioned approximately flush with an upper surface 303 of the second sheet 107; the upper surface corresponding to the back side of the second sheet 107 corresponding to the third page 206.

The lens pair 233/235 is located above at least a portion of the second image 223. Thus, a person viewing page 206 would see the second image 223 through the lens pair 233/235. As the second decoding lens 235 decodes hidden information in the second image 223 and, thus, the hidden information of the second image 223 is revealed to the person viewing the third page 206.

Figure 4A:
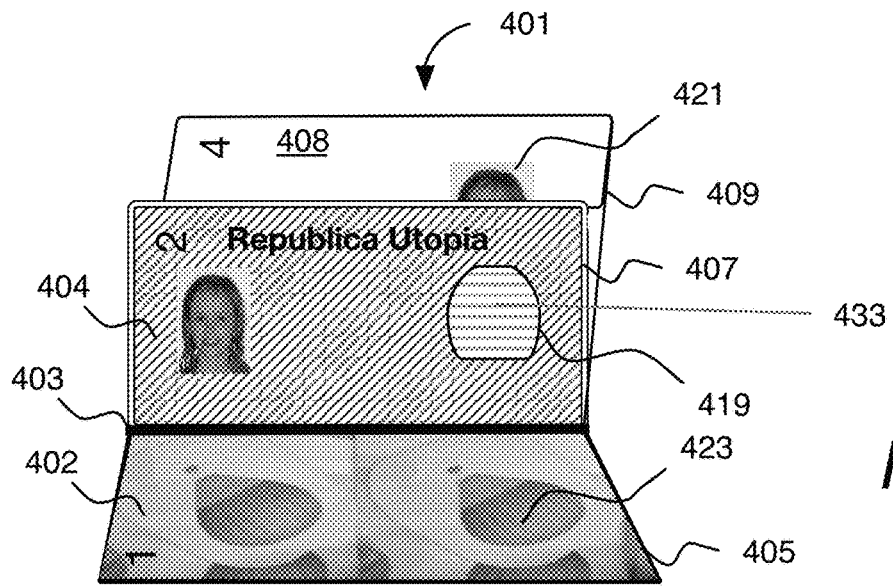
FIG. 4, which consists of FIGS. 4a and 4b, provides illustrations of the multi-page security document opened to two different page spreads.
Figure 4B:
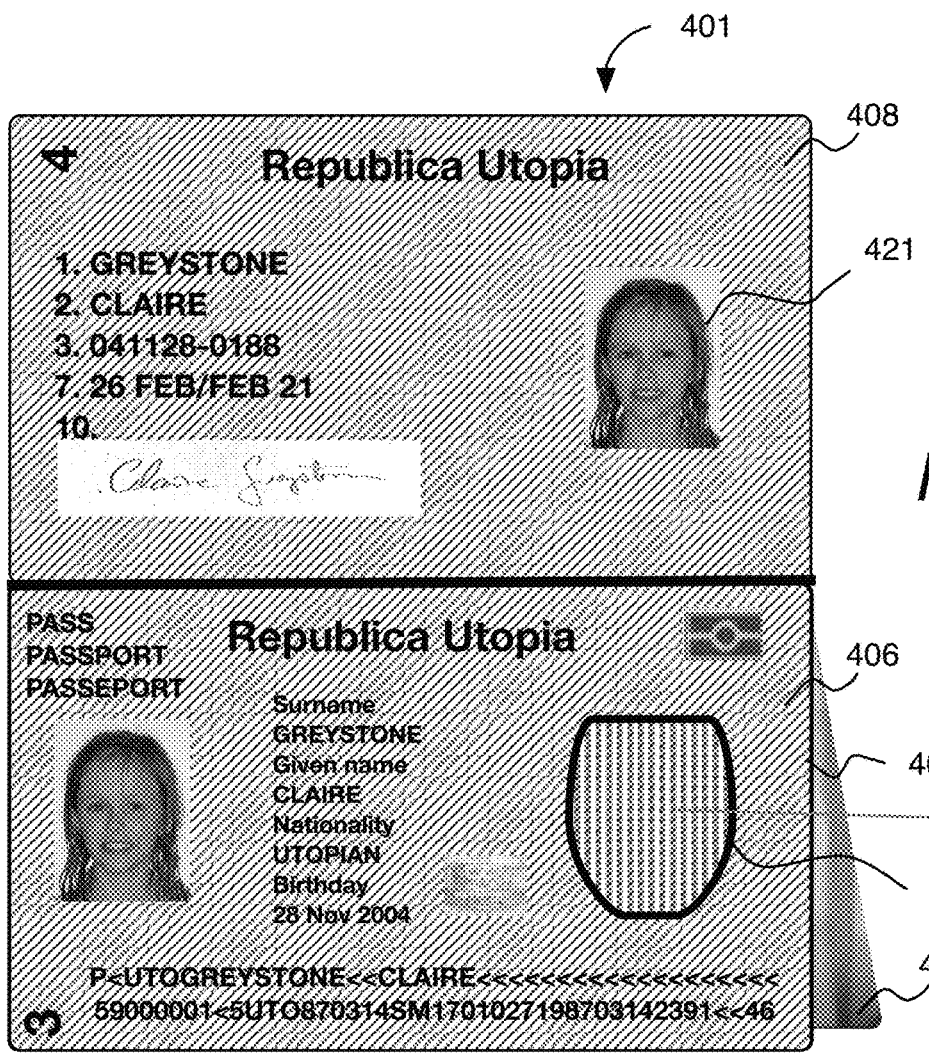

FIG. 4, which consists of FIGS. 4a and 4b, is an illustrative example of a multi-page identification document 101, namely, a passport book 401. The passport book 401 has a front cover 405 corresponding to the first sheet 105 of FIGS. 1 and 2, and multiple interior sheets including a security-features sheet 407 corresponding to the second sheet 107 of FIGS. 1 and 2, and a third sheet 409 immediately behind the security-features sheet 407 and corresponding to the third sheet 109 of FIGS. 1 and 2, wherein, at least, the front cover 405, the security-features sheet 407, and the third sheet 409 are bound together using a binding 403 corresponding to the binding 103 of FIGS. 1 and 2 such that the security-features sheet 407 is located between the front cover 405 and the third sheet 409.

In the illustration of FIG. 4a the passport book 401 is opened to reveal the inside front cover 402 corresponding to page 202 of FIG. 2, the front page 404 (corresponding to page 204 of the multi-page identification document 101) of the second sheet 407, which may contain a multitude of security features including a machine-readable travel document chip, holograms, perforations, and a data page. The security-features sheet 407 has a see-through window 419 to a fourth page 408 of the passport book 401; the fourth page 408 being the front page of the third sheet 409. The see-through window 419 is aligned with an image 421, e.g., a photograph, corresponding to image 221 of FIG. 2, is located on the fourth page 408. Not illustrated in FIG. 4a, the image 421 contains hidden information not visible to an unaided eye. However, the hidden information is revealed by a first decoding lens 433 when the sheet 407 having the first decoding lens 433 is placed against the fourth page 408, which contains the first image 421 with the hidden information.

The inside front cover 402 contains a second image 423 (obscured in FIG. 4b by the data page 406). The second image 423 also contains hidden information that may be revealed using a second decoding lens 435 of FIG. 4b (not shown in FIG. 4a but corresponding to second decoding lens 235 of FIGS. 2 and 3) that corresponds to the hidden information of that second image 423. Alternatively, as described in greater detail hereinbelow, the hidden information of the second image 423 is revealed by the second decoding lens 435 in combination with the first decoding lens 433.

In many multi-page identification documents, the data page is the page that receives the most attention by a person scrutinizing the multi-page identification documents. For example, in the passport document 401, the data page 406 may contain the clearest photograph of the identified individual, biographical information that may be used for verifying the identity of the individual, a machine-readable area, a hologram, and an icon denoting that the sheet includes an integrated circuit chip.

Of course, the see-through window 419 is also present on the data page 406 as it is the backside of the security-features sheet 407. However, when the multi-page security document 401 is opened to the data page 406, the first decoding lens 433 is not placed over the first image 421 having hidden information. Therefore, even though the hidden information of the first image 421 is a valuable security feature, that security feature would not be visible to the person examining the multi-page security document 401 while viewing the data page 406. However, the see-through window 419, from the vantage point of the data page 406 provides a view of the second image 423 if the security-features page 407 is placed against the inside front cover 402. For that purpose, the security-features page 407 contains a second decoding lens 435 that contains structures to decode the hidden information contained in the second image 423.

Because the first decoding lens 433 and second decoding lens 435 are located in the security-features sheet 407, images that are decoded by the first decoding lens 433 must be located on other sheets, i.e., either the inside front cover 402 or the fourth page 408.

Figure 5A:
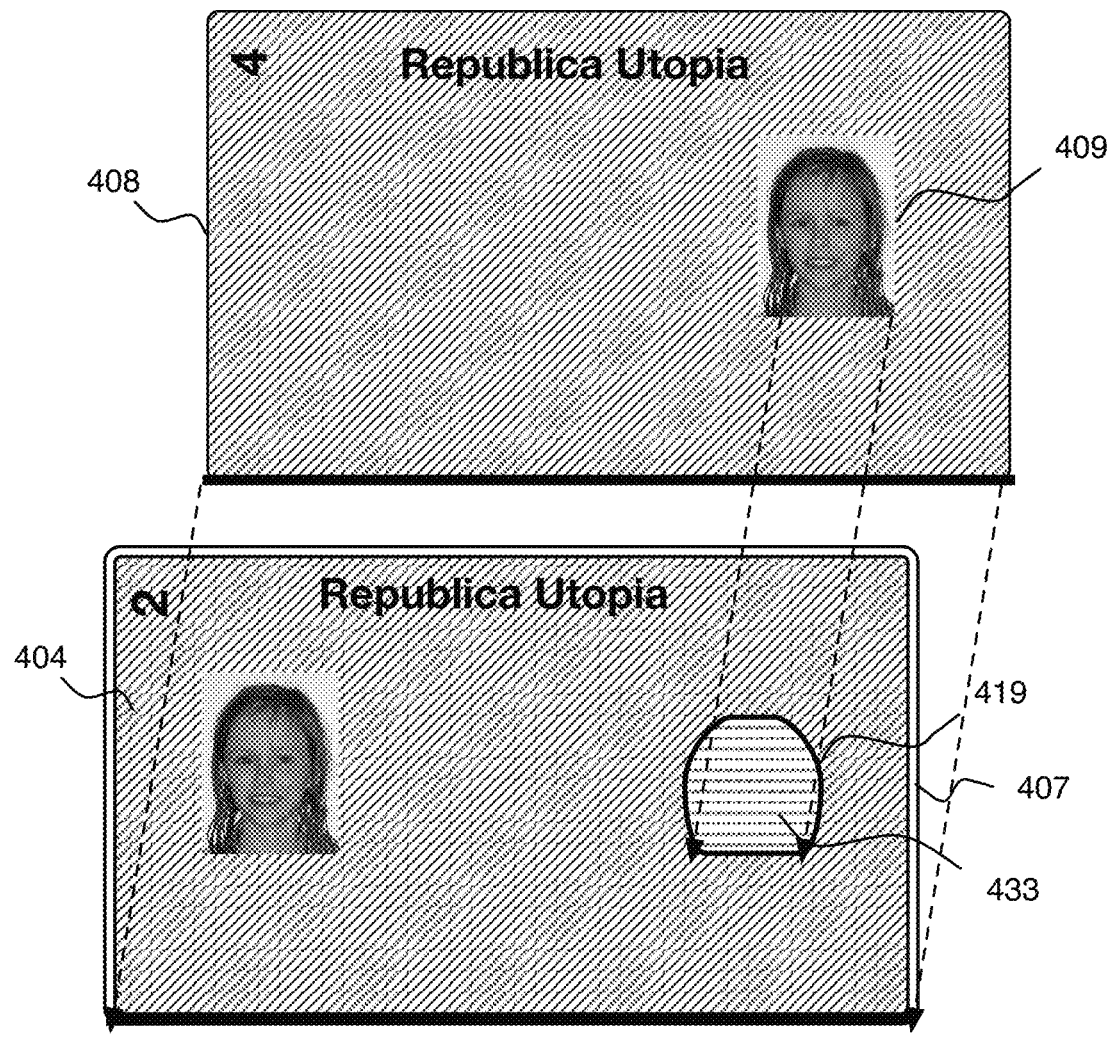
FIG. 5a provides an illustration of the front page of a security-features sheet of multi-page security document and the fourth page in greater detail including a decoding lens in the see-through window and an associated photograph on the fourth page.

FIG. 5a is a greater-detail illustration of the front page 404 of the security-features sheet 407 and the fourth page 408 more clearly illustrating the alignment of the see-through window 419 and the first image 421.

Figure 5B:
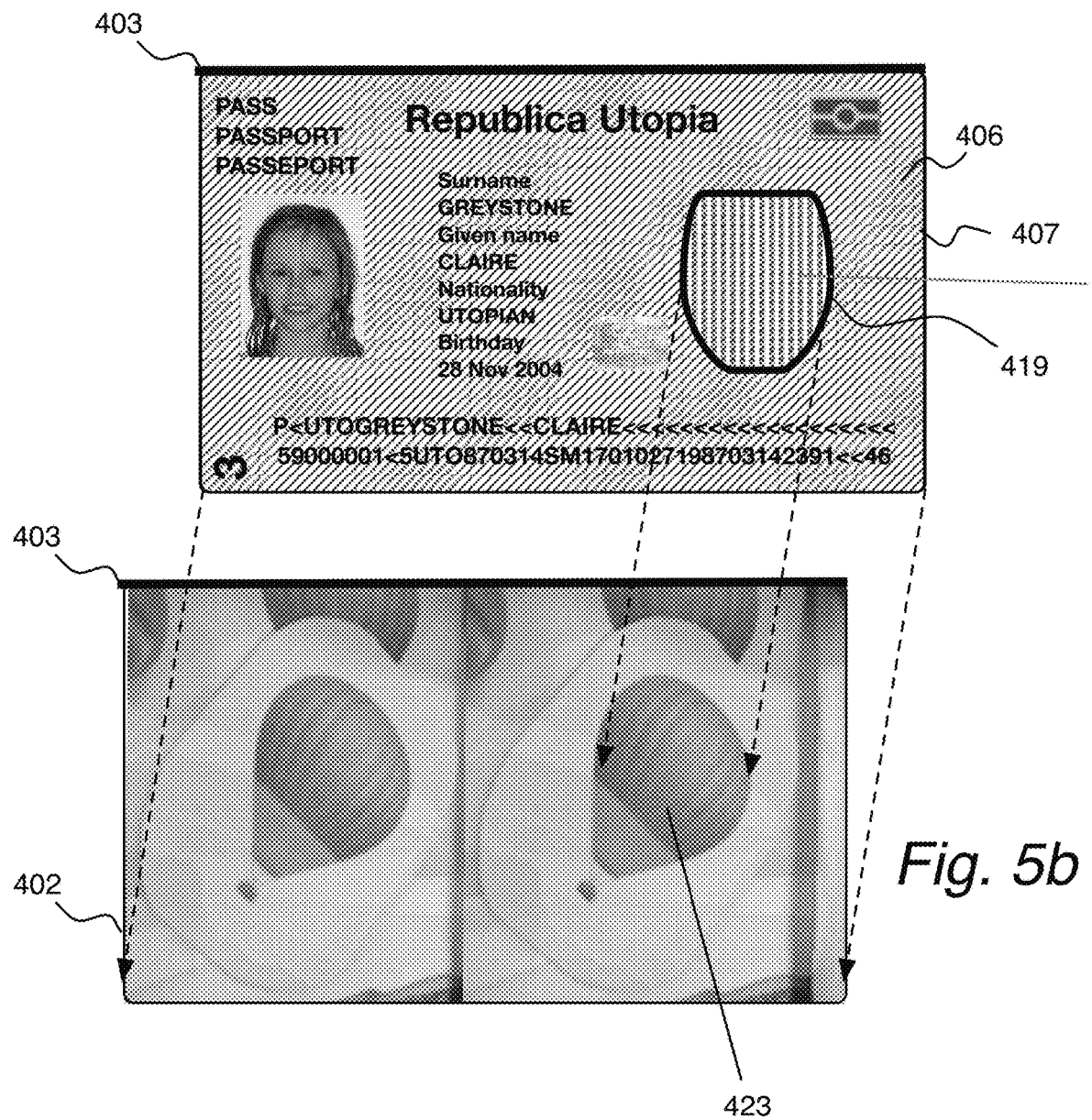
FIG. 5b provides an illustration of the back page of a security-features sheet of multi-page security document and the first page in greater detail including a decoding lens in the see-through window and an associated image on the first page.

Conversely, FIG. 5b is a greater-detail illustration of the data page 406 of the security-features sheet 407 and the first page 402 more clearly illustrating the alignment of the see-through window 419 and the second image 423.

Figure 6:
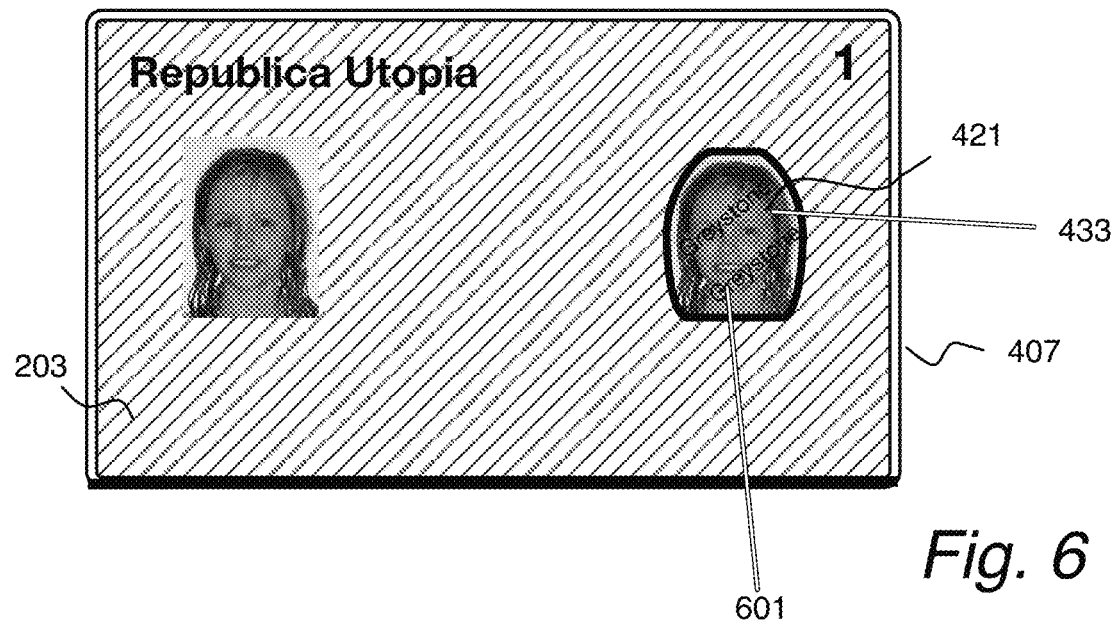
FIG. 6 is an illustration of the security-features sheet placed against the fourth page revealing hidden information in the associated photograph decoded through a first decoding lens.

FIG. 6 is an illustration of the security-features sheet 407 placed against the fourth page 408, which is hidden behind the security-features sheet 407 except for the image 421, which is visible behind the first decoding lens 433 thereby revealing hidden information 601 in the image 421 decoded through the first decoding lens 433. In the example of FIG. 6, the hidden information 601 is the last name of the bearer of the passport document 401.

Figure 7:
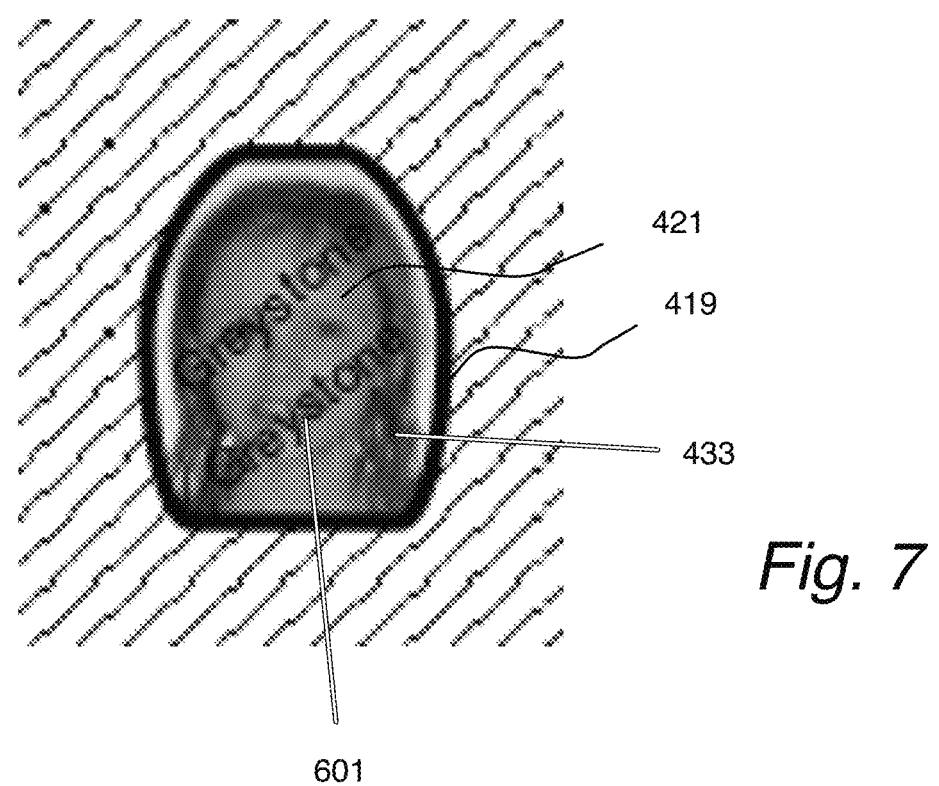
FIG. 7 is an enlarged view of the revealed hidden information from FIG. 4.

FIG. 7 is an enlarged view of the revealed hidden information 601 from FIG. 6. The first decoding lens 433 decodes the hidden information 601 that is hidden in the image 421. The image 421 and the hidden information is visible in the see-through window 419 through the decoding lens 433.

Figure 8A:
FIGS. 8a and 8b are alternative illustrations of the inside front cover of the multi-page security document of FIG. 4.

FIG. 8a is an illustration of a first example of an inside front cover 802 corresponding to the inside front cover 402 of the passport of FIG. 4. Contrary to the example of FIG. 4, where inside front cover 402 is an intaglio printed page with a graphic, the inside front cover 802 contains a second image 823 that is simply a monotonous color. The second image 823 includes hidden information that may be revealed using the second decoding lens 435 that corresponds to that hidden information. Of course, as is the case with the image 421 located on the fourth page 408, the inside front cover 402 could contain a photograph or other graphic.

Figure 8B:
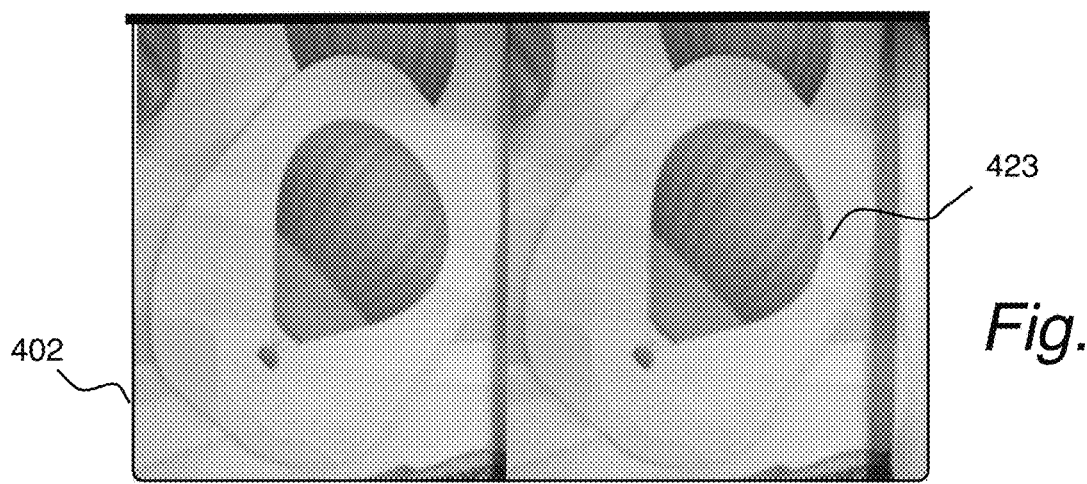

FIG. 8b provides another example of an inside front cover 402 that contains a second image 423 that includes hidden information that may be revealed using the second decoding lens 435 that corresponds to that hidden information.

The second image 423 may be printed with a combination of one or more of offset printing, intaglio printing, and ink jet printing. Other printing technologies may also be used. Very common in security documents is the combination of offset printing and intaglio printing. The latter produces print elements that have a small amount of three-dimensionality; i.e., it is actually possible to feel the print elements by running a finger over the intaglio printed print elements. In an embodiment, the hidden information is hidden within the intaglio printed elements and revealed through a combination of decoding lenses as described hereinbelow.

Figure 9:
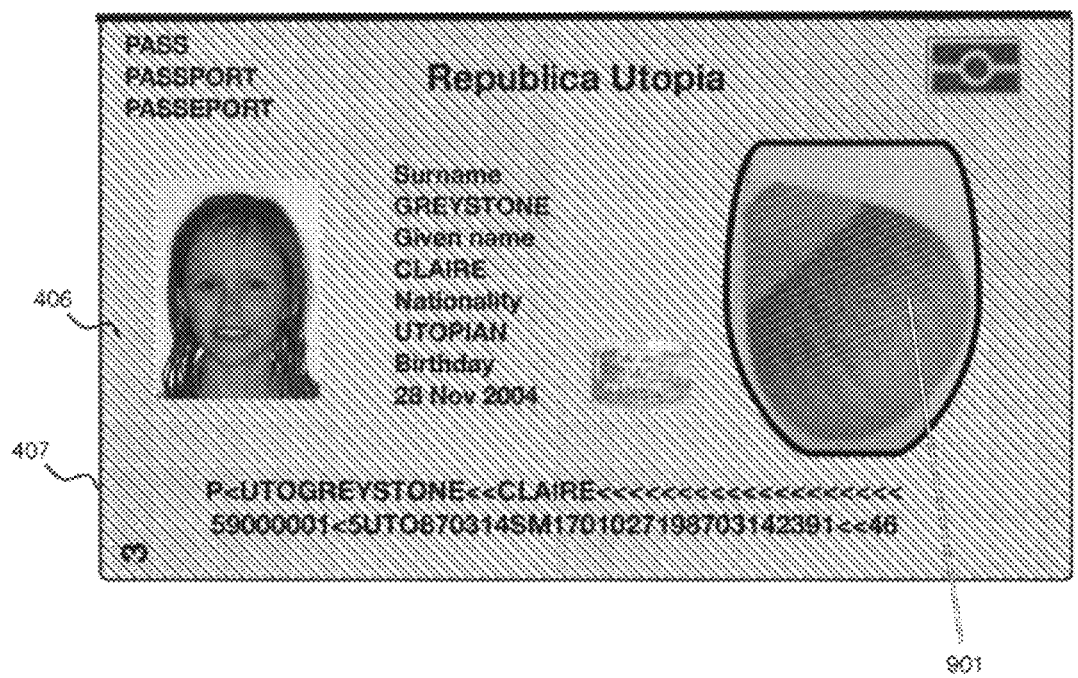
FIG. 9 is an illustration of the security-features sheet of FIG. 4 placed against the inside front cover of the multi-page security document revealing hidden information in the image of the inside front cover when decoded through a first and a second decoding lens.

FIG. 9 is an illustration of the security-features sheet 407 open to the data page 406 and having the security-features sheet 107 placed against the inside front cover 402 revealing a first hidden information 901 in the second image 423 of the inside front cover 402 when decoded through the second decoding lens 435. In the example of FIG. 9, the hidden information may be revealed through a moiré magnification performed by the second decoding lens 435, which then acts as a moiré magnification device revealing information hidden in a moiré base layer.

Figure 10:
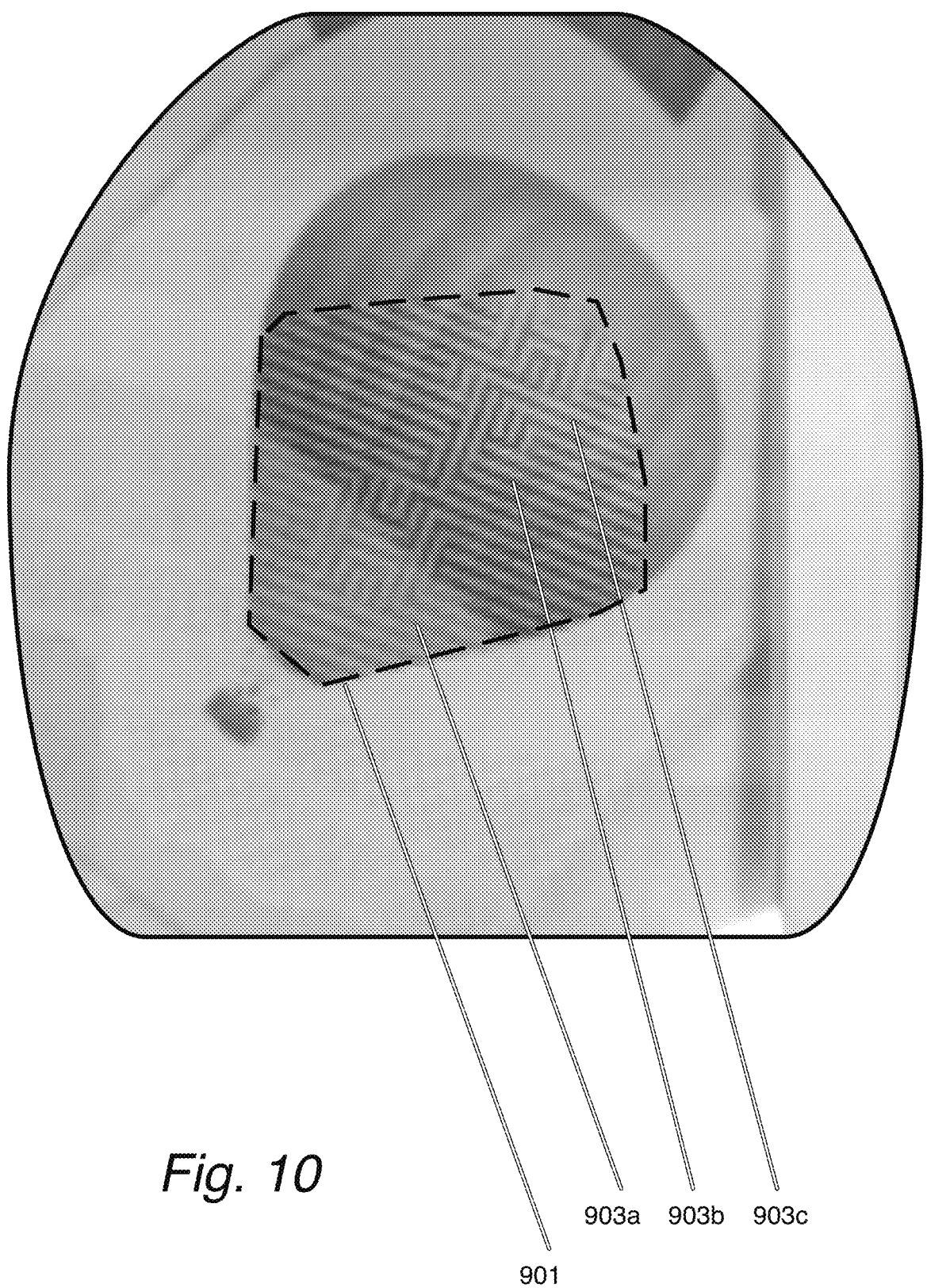
FIG. 10 is an enlarged view of the revealed hidden information from FIG. 9.

FIG. 10 is an enlarged view of the revealed hidden information 901 from FIG. 9 illustrating that in this example the decoded hidden information consists an intaglio pattern 901. FIG. 10 further illustrates a further embodiment in which the intaglio pattern 901, which corresponds to the first hidden information of FIG. 9, further contains a second hidden information 903a-c revealed by the second decoding lens 435.

As noted above, the second hidden information may be a moiré pattern and the second verification lens 435 is a moiré decoding device. In such an embodiment, the second hidden information 903a-c is revealed through a moiré magnification of a moiré base layer.

Figure 17:
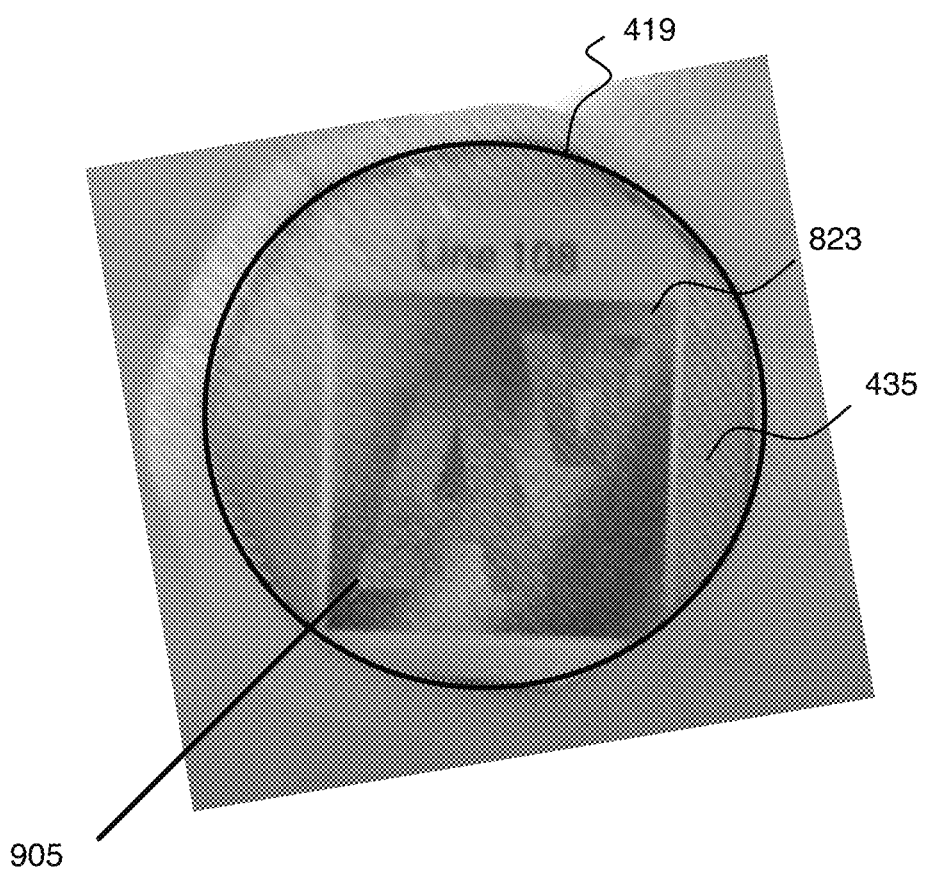
FIG. 17 provides an alternative example of revealed hidden information from the inside front cover of the passport book of FIG. 4.

FIG. 17, which corresponds to FIG. 8a, provides an additional example of an image 823 located on the inside front cover of a passport 401. The image 823 contains hidden information 905 that is revealed when viewed through the combination of the first decoding lens 433 (not directly seen in FIG. 17 as it is behind the second decoding lens 435) and the second decoding lens 435.

Figure 11A:
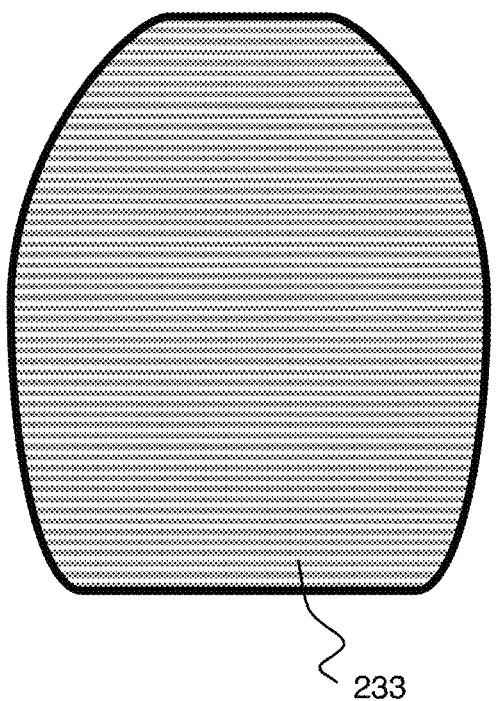
FIG. 11, which consists of FIGS. 11a and 11b, is an illustration of the two decoding lenses illustrating that the decoding material of the decoding lenses are rotated with respect to one another.
Figure 11B:
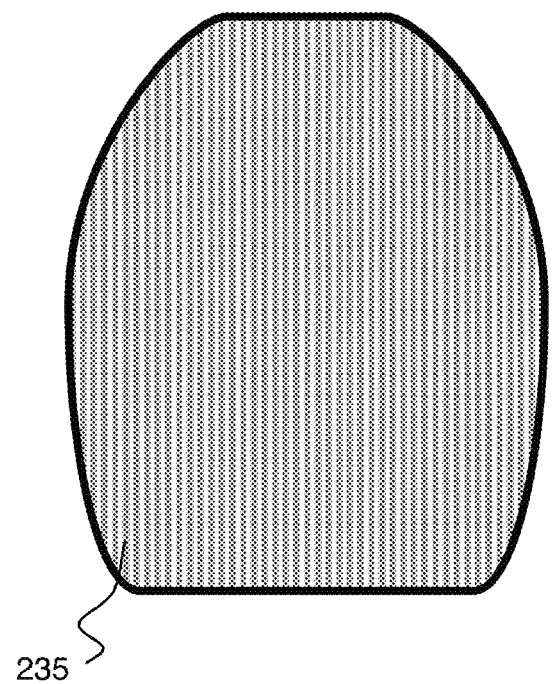

FIG. 11, which consists of FIGS. 11a and 11b, provides an illustration of the two decoding lenses 233 and 235 of FIGS. 2a and 2b illustrating that the decoding material of the decoding lenses are rotated with respect to one another. In an embodiment, the decoding lenses 233 and 235 are lenticular lenses each consisting of an array of parallel linear cylindrical lenses, herein individually referred to as a lenticule. The direction of the lenticules in lens 233 is arranged at an angle of at least 10 degrees with respect to the direction of the lenticules in lens 235. By having different orientation for the two lenses, the second decoding lens 235 does not interfere with decoding of hidden information in the first image 221 by the first decoding lens 233.

Figure 12:
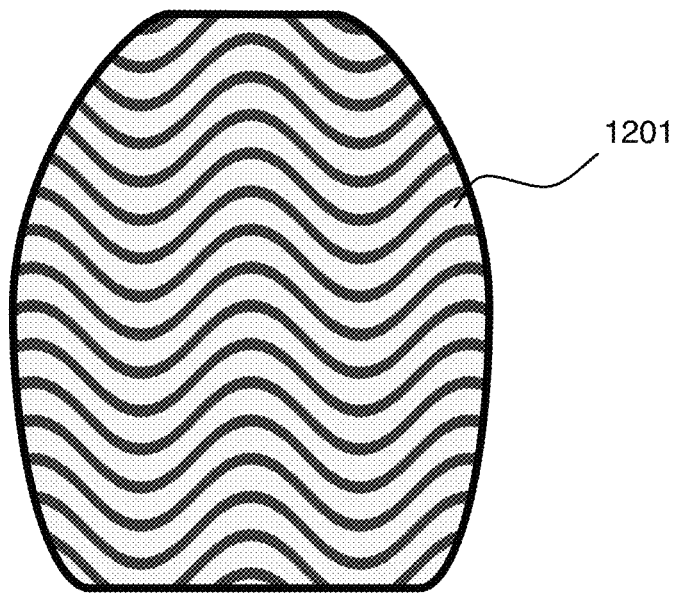
FIG. 12 is an illustration of an alternative lenticular lens, which is composed of an array of sinusoidal lenticules, and which may be used as the first or second decoding lens of, for example, FIG. 2, in an alternative embodiment.

Alternative embodiments avoid interference between the two decoding lenses by selecting shapes for the lenticules that reduce the amount of overlap between lenticules of the first decoding lens with respect to lenticules of the second decoding lens. FIG. 12 is an illustration of an alternative lenticular lens 1201, which is composed of an array of sinusoidal lenticules and which may be used as either the first 233 or the second decoding lens 235. Other shapes that reduce the overlap of lenticules in the first decoding lens 233 with respect to lenticules in the second decoding lens 235 are also possible; examples include concentric circles and zig-zag patterns.

Hereinabove is described a mechanism by which a combination of decoding lenses operate to reveal hidden information through a see-through portion of a page of a multi-page security document regardless of from which direction the see-through portion is viewed wherein the viewing direction depends on to which page spread the multi-page security document is opened. In an alternative embodiment described hereinbelow, the two decoding lenses operate as a pair to provide dynamic effects when the images containing hidden information are viewed through the decoding lens pair.

With respect to revealing the hidden information, there is an optimal distance between a decoding lens and an image containing the hidden information that is revealed by the decoding lens. The optimal distance is the focal length of the decoding lens, which ideally is equal to the second sheet 107. Consider again FIG. 3. As the two decoding lenses are separated by a small distance, both decoding lenses are not at an optimal distance from the image 223. Thus, as the second sheet 107 is moved into proximity with the first page 202 the first decoding lens 233 first interacts with the image 223 and reveals the intaglio pattern 901. As the security-features sheet 107 is moved into closer proximity, i.e., within the optimal distance of the second decoding lens 235, the second hidden information 903 becomes visible.

The effect can also have the appearance of a movement in the image 223 as the second sheet 107 is placed in contact with the first page 202 sequentially revealing the first and the second hidden information 901 and 903, respectively. It should be noted that optimal distance is the distance when the hidden information is most visible or of highest quality. Thus, both hidden information 901 and 903 may be visible at the same time, with one being clearer than the other.

Figure 13:
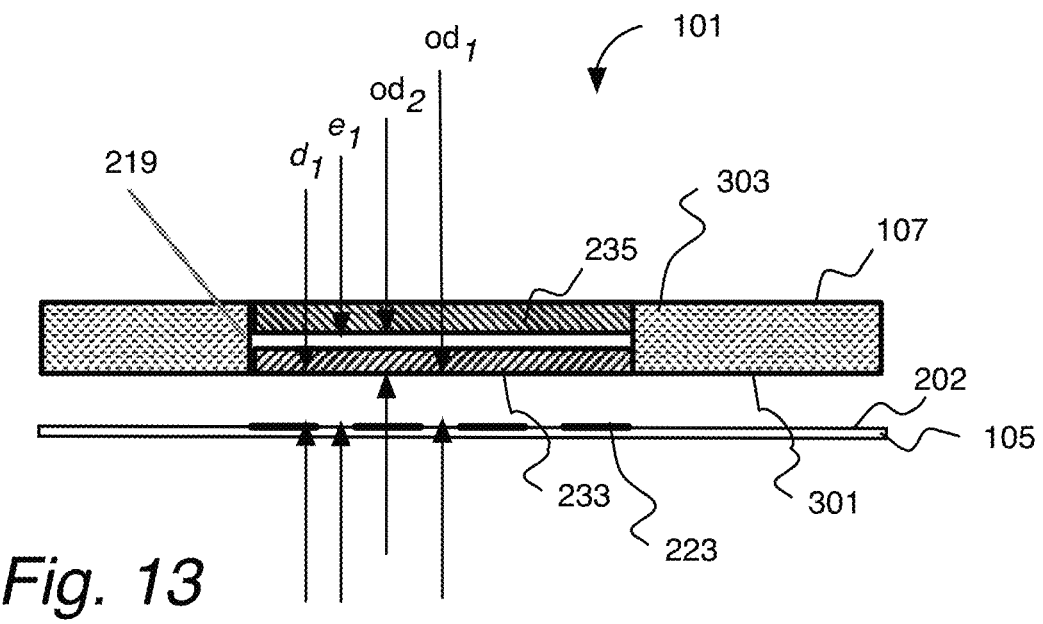
FIG. 13 is a cross-section of the multi-page security document of FIG. 3 slightly open between the front cover and the security-features page.

FIG. 13 is a cross-section of the multi-page security document 101 slightly open between the first sheet 105 and the second sheet 107. For this example, consider the optimal distance for the first decoding lens 233 to be $od_1$ and the optimal distance for the second decoding lens 235 to be $od_2$. The distance between the first decoding lens 233 and the image 223 is a distance $d_1$. If the optimal distances for both lenses are both approximately $d_1$, then, in the example of FIG. 13, the first decoding lens 233 would reveal the first hidden information in the image 223. However, in that case, the distance $e_1$ between second decoding lens 235 and image 223 is much larger, perhaps as large as 2×od. Therefore, the second hidden information, which is revealed by the second decoding lens, would not be optimally revealed.

Figure 14:
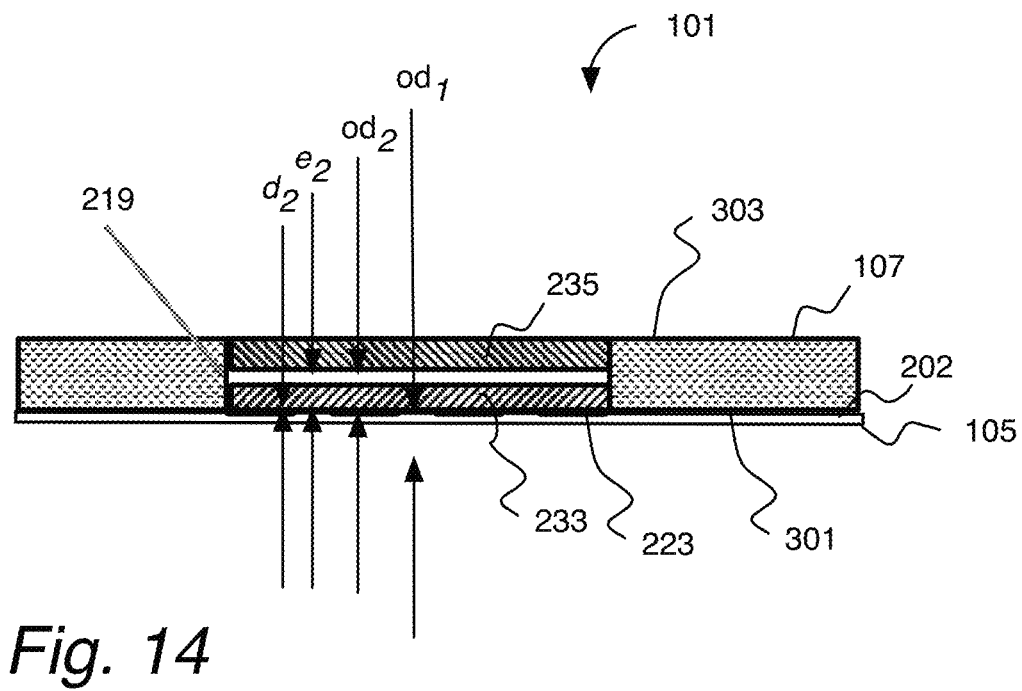
FIG. 14 is a cross-section of the multi-page security document of FIG. 11 with the security-features page flush against the inside front cover.

FIG. 14 is a cross-section of the multi-page security document 101 with the second page 107 placed flush against the first page 105. For this example, consider the optimal distance for the two decoding lenses are considered the same as in the example of FIG. 13. The distance between the first decoding lens 233 and the image 223 is a distance $d_2$, which with the pages flush against each other is essentially 0 or the distance that the first decoding lens 223 is offset from the surface of the security-features page 107. This distance is smaller than the $od_1$. However, the distance $e_2$ between second decoding lens 235 and image 223 is larger, ideally equal to the optimal distance for the second decoding lens, $od_2$. Therefore, the second hidden information 903 would now be optimally revealed.

While FIGS. 3. 13. and 14 show lenses 233 and 235 as being flush with respective sides of the second sheet 107, in alternative embodiments the decoding lenses are recessed into the second sheet 107 or elevated above the second sheet 107. In yet an alternative embodiment, the decoding lenses may have an irregular profile over the span of the see-through portion 219.

Figure 15:
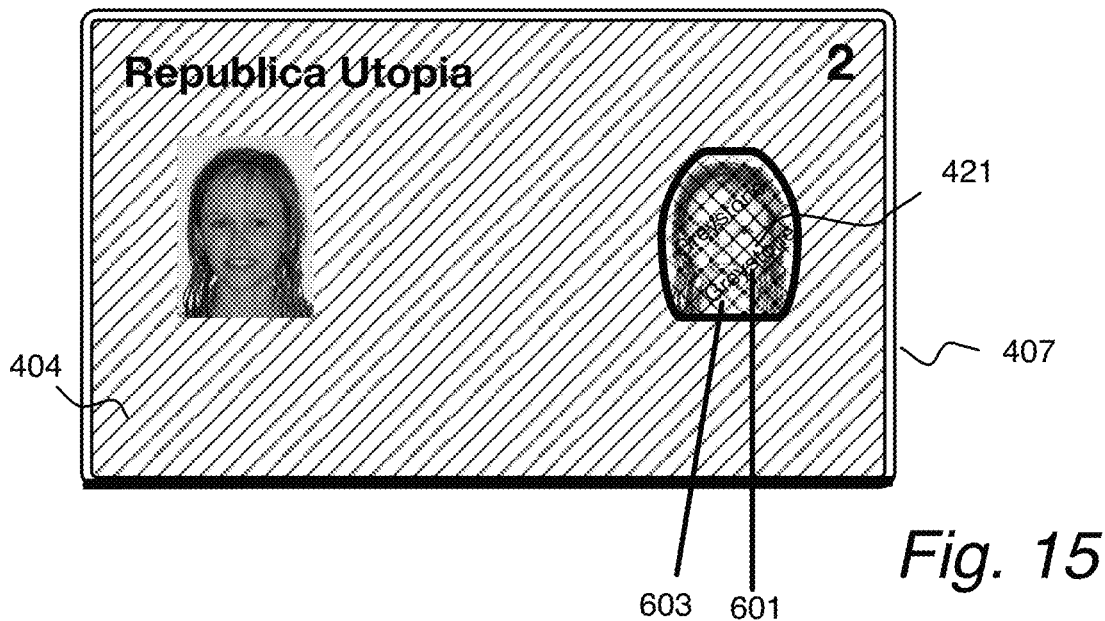
FIGS. 15 and 16, which correspond to FIGS. 6 and 7, illustrate additional hidden information placed in an image on a page adjacent to the security-features page and on the opposite side of it with respect to the inside front-cover page.
Figure 16:
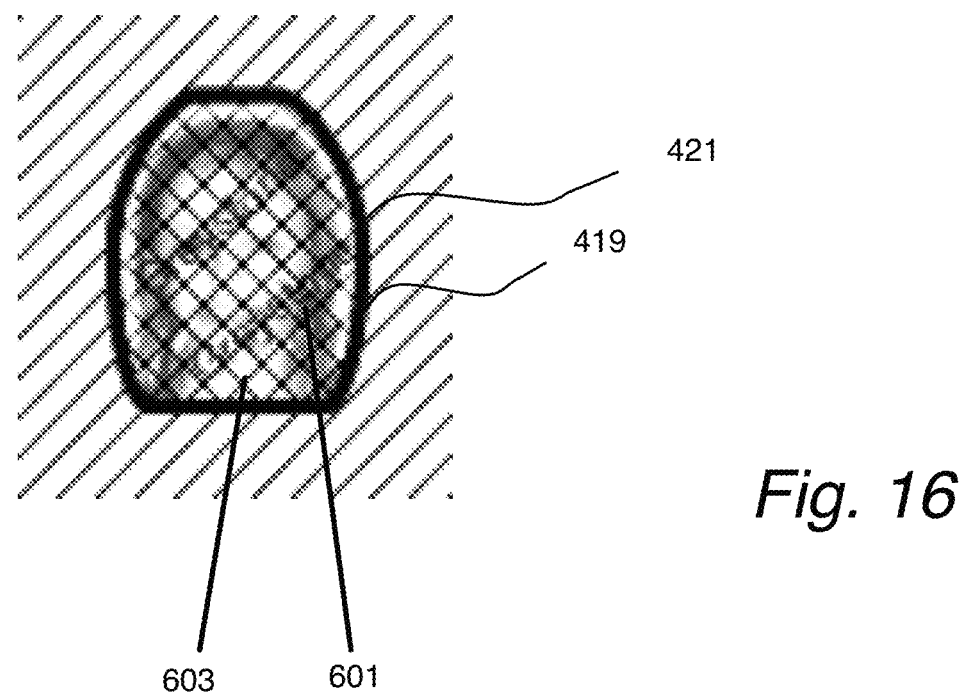

While in the example of FIGS. 6 and 7 only one hidden information was revealed by the decoding lens pair 433/435, in an alternative embodiment described above in conjuction with FIGS. 13 and 14, the first image 421 may contain two hidden information items. This is illustrated in FIGS. 15 and 16, which correspond to FIGS. 6 and 7, respectively, but with an additional hidden information 603 in form of a diagonal square pattern. Thus, in this alternative embodiment, the decoding lens pair 433/435 reveals two pieces of hidden information regardless of which image (image 421 or image 423) that the security-features page 407 is placed against. This extension applies equally to alternative implementations of the general case illustrated in FIG. 2.

In alternative embodiments, the hidden information is printed in the second image using a printing technique such as intaglio, offset, silkscreen, or ink jet.

In alternative embodiments, the hidden information is printed in the second image using visible-light visible ink, fluorescent ink, infra-red transparent ink, or infra-red absorbent ink.

As noted above, in one embodiment, the second verification feature is an array of partial images included in the first verification lens and that are revealed through viewing through the second verification lens. This type of security feature may be referred to as a changeable or multiple laser image (CLI/MLI). CLI/MLI images change as the security article is tilted to different viewing angles.

Figure 18:
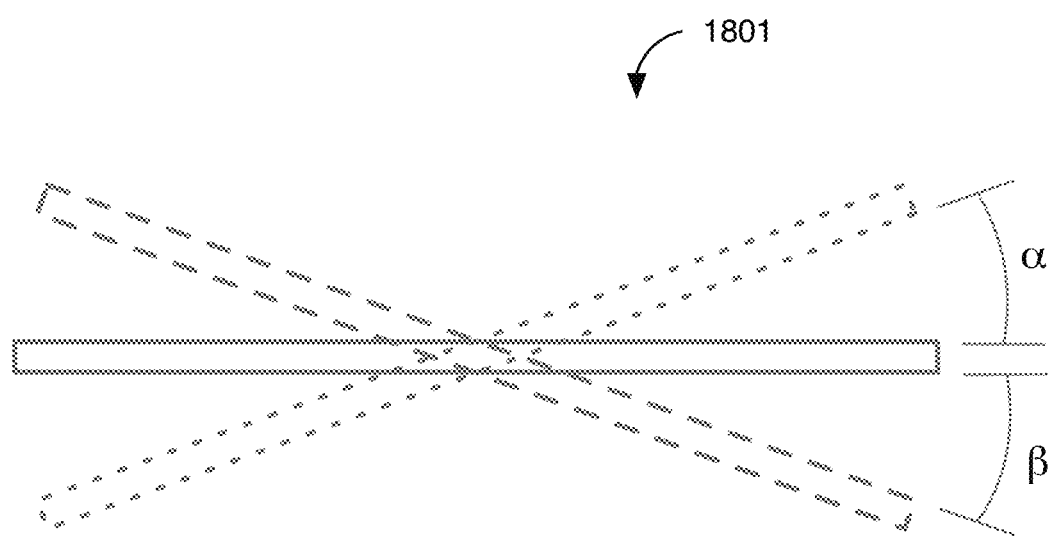
FIG. 18 is a side view illustrating that the security article, which corresponds to security article of FIG. 1, may be tilted at different angles to view different images.
Figure 19A:
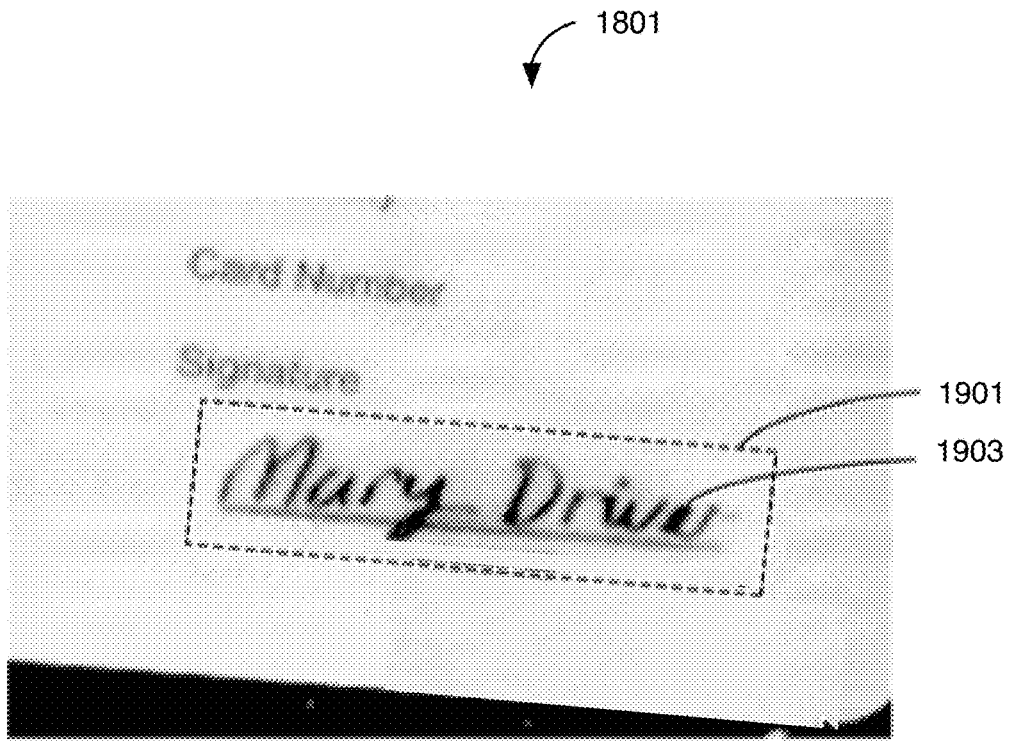
FIG. 19, which is composed of FIGS. 19a-c, are plan views of a section of a sheet of a multipage security document depicting sample composite images formed in a decoding lens of the sheet when viewed from different angles.
Figure 19B:
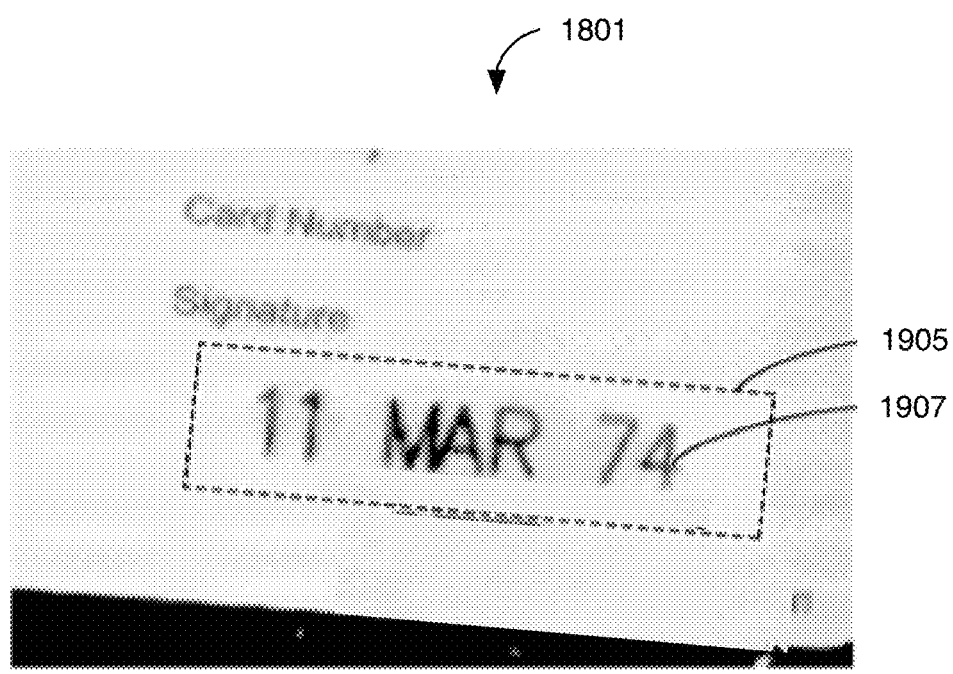
Figure 19C:

FIG. 18 is a side view illustrating that the security article 1801, which corresponds to security article 101 of FIG. 1, may be tilted at different angles to view different images. FIG. 19, which is composed of FIGS. 19a-c, are plan views of a section of a sheet of a multipage security document 1801 depicting sample composite images formed in a decoding lens of the sheet. For example, a first image may be viewable at angle α. A second image may be viewable at angle β. A third composite image may be viewable when the security article is horizontal. For example, as illustrated in FIG. 19a, the first image 1901 may be the bearer's signature 1903. The second image 1905 may be, as illustrated in FIG. 19b, the bearer's birth date 1907. The third image 1909 may be, as illustrated in FIG. 19c, the bearer's cardnumber 1911. To a user of the security article 1801, the composite images "appear to be switching" to different composite images, as the security article 1801 is positioned at different angles. For instance, the security article 1801 may be rotated around any axis. For example, the security article may be rotated as about two different orthogonal axes or may be rotated about an axis perpendicular to the plane of security article 1801 of FIG. 18 or may be rotated about an axis in the plane of security article 1801 of FIG. 18. Regardless of the rotation, to the user's unaided eye, the image switches to a different image, depending on the relative position of the security article.

Figure 20A:
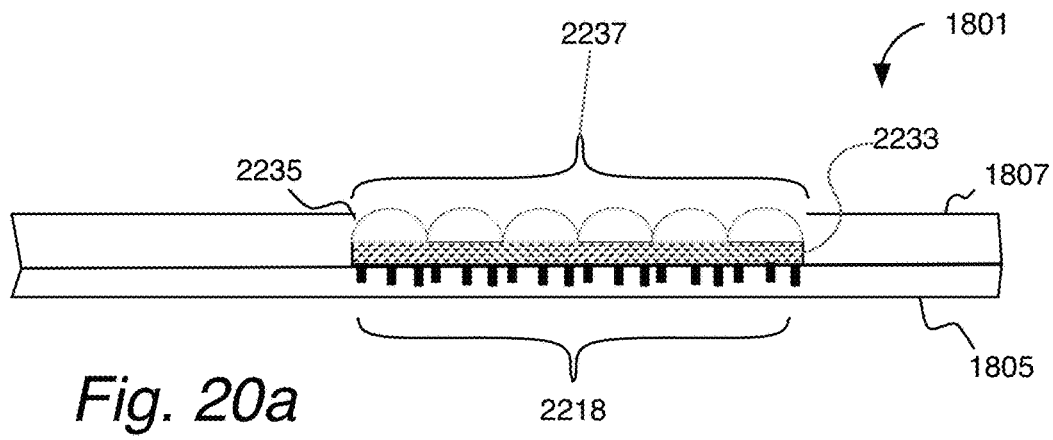
FIG. 20, which is composed of FIGS. 20a-d, present graphical schematic representation of cross section views of the security document of FIG. 18.

FIG. 20a is a cross section view of the security document 1801 of FIG. 18. A second verification lens 2235 (corresponding to the second verification lens 235 of FIG. 3) is an array of longitudinal lenses 2237 having a focal distance that is shorter than the thickness of the second sheet 1807. In alternative embodiments, different lens geometries may be employed, e.g., circular lenticular lenses, microspheres.

The image area 2018 located on a first sheet 1805 may be laser marked through the combination of lenses 2235/2233 at the multiple tilt angles to produce multiple image strips that are in register with longitudinal lenses 2237.

Thus, as illustrated in the embodiment of FIG. 20a, an image array 2218 corresponding to three distinct images is recorded at three different angles on the first sheet 1805 through the combination of lenses 2235/2233. Conversely, when viewed through the lens pair 2233/2235 at a tilt angle corresponding to a particular recording angle, the associated image is visible.

Figure 20B:
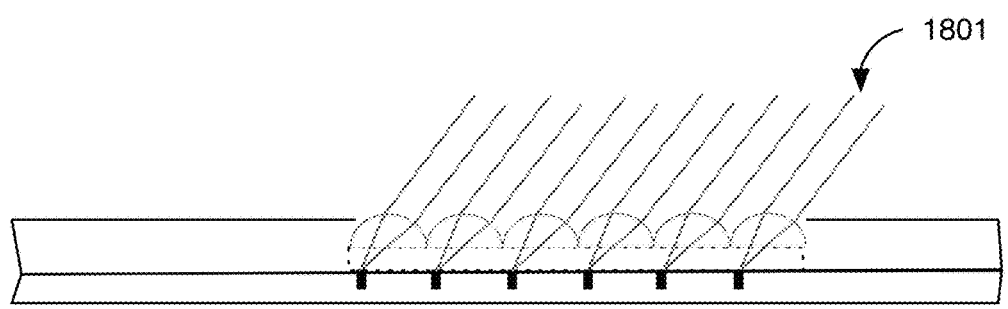
Figure 20C:
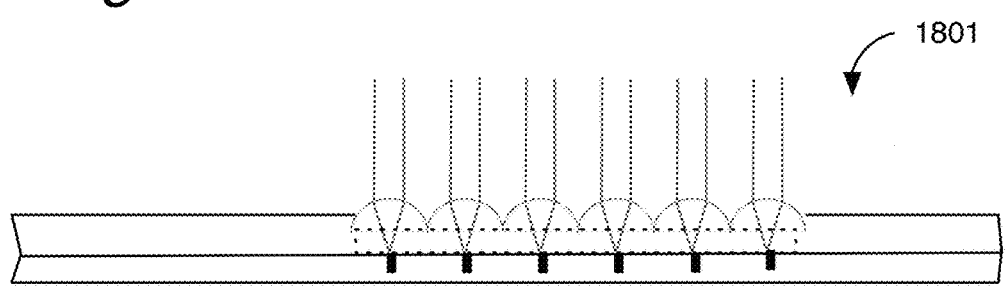
Figure 20D:
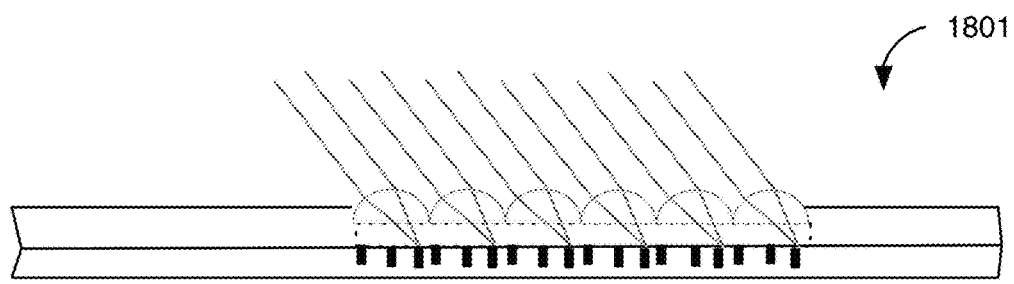

In FIG. 20b, a first image, e.g., the bearer signature 1903, is recorded at a first angle, e.g., at an angle to the plane of the first sheet 1805 and second sheet 1807 corresponding to the first tilt angle α; in FIG. 20c, a second image, e.g., the bearer's birth date 1907, is recorded essentially perpendicular to the plane of the first sheet 1805 and second sheet 1807; and in FIG. 20d; and in FIG. 20d, a third image, e.g., the document card number 1911, is recorded at an angle corresponding to the second tilt angle β.

A mechanism for recording MLI/CLI images, albeit through one lens, is described in U.S. Pat. No. 4,765,656 to Becker et al.

The hidden information printed in first image 221, in the second image 223, or placed in the first lens 233 as an array of partial images, may be added during the production of a series of security documents and, thus, would not be personalized. In that case, the hidden information may be logos, symbols of nationality, patterns, or any other information that may be associated with the security document and used to confirm the validity of the security document as being an authentic security document, e.g., a passport belonging to the country whose national symbol appears when revealed by the combination of decoding lenses.

Alternatively, the hidden information maybe personalized information added during personalization. As such, the hidden information may be surnames or passport numbers.

From the foregoing it will be apparent that a mechanism is provided by which a see-through window in a multi-page security document may be used to reveal hidden information on two unrelated pages regardless of which page the sheet having the see-through window is placed over. Such a mechanism provides a powerful security feature in that regardless of whether a person scrutinizing the security-document has the document open to the front page of the sheet having the see-through window or to the back page of the sheet having the see-through window, the person scrutinizing the document would see an image having hidden information, the absence of which would alert the person scrutinizing the document that the document may be a fake.

Although specific embodiments of the invention have been described and illustrated, the invention is not to be limited to the specific forms or arrangements of parts so described and illustrated. The invention is limited only by the claims.

I claim:

1. A multipage security document, comprising:
   a first sheet;
   a second sheet connected along one side to the first sheet such that the second sheet may be placed against the first sheet, the second sheet having a see-through portion;
   a first verification lens located in the see-through portion and corresponding to a first verification feature, said first verification lens is a first decoding lens; and
   a second verification lens is collocated with the first verification lens as an adjacent layer to the first verification lens in the see-through portion and corresponding to a second verification feature, said second verification lens is a second decoding lens,
   wherein both the first verification lens and the second verification lens are located in same said see-through portion,
   such that the combination of the first and second decoding lenses operate to reveal hidden information through the see-through portion of the second sheet of the multi-page security document regardless of from which direction the see-through portion is viewed wherein the viewing direction depends on to which page spread the multi-page security document is opened,
   a third sheet connected along one side to the first and second sheet, the third sheet located adjacent to the second sheet;
   wherein the first verification feature is located on a fourth page located on the third sheet on a side of the third sheet adjacent to the second sheet, the first verification lens is a decoding lens, the first verification feature is a first hidden information located in a first image printed on the fourth page such that when the see-through portion is placed above the first image, the first verification feature is revealed by the first verification lens; and
   wherein the second verification feature is located on a first page located on the first sheet on a side adjacent to the second sheet the second verification lens is a decoding lens, the second verification feature is a second hidden information located in a second image located on the first page such that when the see-through portion is placed above the second image, the second hidden information is revealed by the second verification lenses.

2. The multipage security document of claim 1, wherein the multi-page security document comprise at least a first page located on the first sheet and adjacent to the second sheet, a second page located on the second sheet and adjacent to the first sheet, a third page located on the second sheet opposite the second page, and a fourth page located on the third sheet and adjacent to the second page;
   wherein the first verification feature is a first hidden information located in a second image printed on the first page such that when the see-through portion is placed above the second image the first verification feature is revealed by the first verification lens; and
   wherein the second verification feature is a second hidden information located in the second image such that when the see-through portion is placed above the second image, the second hidden information is revealed by the second verification lens.

3. The multipage security document of claim 1, wherein the wherein the second verification feature is a moiré base layer located in the second image such that when the see-through portion is placed above the second image, the second verification feature is magnified through moiré magnification produced by the second verification lens.

4. The multipage security document of claim 1, wherein the multi-page security document comprises at least a first page located on the first sheet and adjacent to the second sheet, a second page located on the second sheet and adjacent to the first sheet, a third page located on the second sheet opposite the second page, and a fourth page located on the third sheet and adjacent to the third page;
   wherein the first verification feature is a first hidden information located in a first image printed on the fourth page such that when the see-through portion is placed above the first image the first verification feature is revealed by the first decoding lens; and
   wherein the second verification features comprises at least one array of partial images visible through the second verification lens such that the each array of partial images is seen as one complete image at a particular viewing angle associated with said each array of partial images.

5. The multipage security document of claim 4, wherein said at least one array of partial images comprises at least two arrays of partial images visible at different viewing angles thereby through the tilting of the security document allowing switching between display of at least two images.

6. The multipage security document of claim 4, wherein the first array of partial images is viewable through a first lens in a first view angle and a second array of partial images is included in the second verification lens, the second array of partial images viewable through a second view angle.

7. The multipage security document of claim 1, wherein the first decoding lens is a lenticular lens of parallel lenticules and the second decoding lens is a lenticular lens of parallel lenticules and wherein the orientation of the lenticules of the first decoding lens is rotated by at least 10 degrees with respect to the orientation of the lenticules of the second decoding lens.

8. The multipage security document of claim 1, wherein at least the first or the second decoding lens is a lenticular lens having non-linear lenticules.

9. The multipage security document of claim 1, wherein the first decoding lens has a first optimal distance for decoding the first hidden information and second decoding lens has a second optimal distance for decoding the second hidden information, wherein first decoding lens is at the first optimal distance from the first sheet when first sheet and second sheet are open by the first optimal distance and wherein the second decoding lens is at the second optimal distance from the first sheet when the first sheet and second sheet are flush against each other.

10. The multipage security document of claim 1, wherein either the first decoding lens or the second decoding lens is flush with respect to a surface of the first sheet.

11. The multipage security document of claim 1, wherein at least one of first and second decoding lens is not flush with respect to a surface of the first sheet.

12. The multipage security document of claim 1, wherein the hidden information is placed in the second image using a printing technique such as intaglio, offset, silkscreen, or ink jet.

13. The multipage security document of claim 1, wherein the hidden information is printed in the second image using visible-light visible ink, fluorescent ink, infra-red transparent ink, or infra-red absorbent ink.

14. The multipage security document of claim 1, wherein the first and the second verification lenses are transparent or, at least, translucent.

* * * * *